United States Patent
Sysoev et al.

(10) Patent No.: US 11,249,923 B1
(45) Date of Patent: Feb. 15, 2022

(54) USING SHARED MEMORY TO TRANSPORT DATA BETWEEN SERVER PROCESSES

(71) Applicant: F5 Networks, Inc., Seattle, WA (US)

(72) Inventors: Igor Sysoev, Moscow (RU); Valentin Bartenev, Moscow (RU); Nikolay Shadrin, San Francisco, CA (US); Maxim Romanov, Moscow (RU)

(73) Assignee: F5, INC., Seattle, WA (US)

( * ) Notice: Subject to any disclaimer, the term of this patent is extended or adjusted under 35 U.S.C. 154(b) by 302 days.

(21) Appl. No.: 16/601,180

(22) Filed: Oct. 14, 2019

Related U.S. Application Data (63) Continuation of application No. 15/695,745, filed on Sep. 5, 2017, now Pat. No. 10,467,151.

(51) Int. Cl.
  *G06F 12/00* (2006.01)
  *G06F 12/1036* (2016.01)
  *G06F 12/1009* (2016.01)

(52) U.S. Cl.
  CPC ...... *G06F 12/1036* (2013.01); *G06F 12/1009* (2013.01); *G06F 2212/65* (2013.01)

(58) Field of Classification Search
  CPC ............. G06F 12/1036; G06F 12/1009; G06F 2212/65
  See application file for complete search history.

(56) References Cited

U.S. PATENT DOCUMENTS

| | | | |
|---|---|---|---|
| 4,387,441 A | 6/1983 | Kocol et al. | |
| 4,769,771 A | 9/1988 | Lippmann et al. | |
| 5,376,752 A | 12/1994 | Limberis et al. | |
| 5,437,031 A | 7/1995 | Kitami | |
| 5,903,627 A | 5/1999 | Shaffer et al. | |
| 5,956,754 A | 9/1999 | Kimmel | |
| 6,085,296 A | 7/2000 | Karkhanis et al. | |
| 6,125,401 A | 9/2000 | Huras et al. | |
| 6,161,169 A | 12/2000 | Cheng | |
| 6,163,801 A | 12/2000 | O'Donnell et al. | |
| 6,735,770 B1 | 5/2004 | Yeager et al. | |
| 6,785,892 B1 | 8/2004 | Miller et al. | |
| 7,549,151 B2 | 6/2009 | Zhou et al. | |
| 7,552,440 B1 | 6/2009 | Stewart et al. | |
| 7,653,675 B2 | 1/2010 | Myers et al. | |
| 8,281,060 B2 | 10/2012 | Supalov et al. | |
| 10,778,623 B1* | 9/2020 | Wu | A63F 13/48 |
| 10,805,246 B1* | 10/2020 | Egles | H04L 65/607 |
| 2002/0144006 A1 | 10/2002 | Cranston et al. | |

(Continued)

OTHER PUBLICATIONS

Jazayeri, M., Java, in Encyclopedia of Software Engineering, 2002, J.J. Marciniak (Ed), p. 9 (Year 2002).

*Primary Examiner* — Baboucarr Faal
(74) *Attorney, Agent, or Firm* — Troutman Pepper Hamilton Sanders LLP (Rochester)

(57) ABSTRACT

Data is dynamically shared from a first process to a second process by creating a shared memory segment, obtaining a file descriptor referencing the shared memory segment, and mapping the shared memory segment in an address space of a first process. The file descriptor is sent to a second process. Responsive to receiving the file descriptor, the shared memory segment is mapped in an address space of the second process. Via the shared memory segment, data from the first process is shared to the second process.

20 Claims, 5 Drawing Sheets

(56) References Cited

U.S. PATENT DOCUMENTS

| | | |
|---|---|---|
| 2002/0147785 A1* | 10/2002 | Venkatsubramanian .................... G06F 9/544 709/213 |
| 2003/0061395 A1 | 3/2003 | Kingsbury et al. |
| 2003/0097489 A1 | 5/2003 | Nagarajayya et al. |
| 2005/0044551 A1 | 2/2005 | Sodhi |
| 2005/0091439 A1 | 4/2005 | Mohiden et al. |
| 2006/0053267 A1 | 3/2006 | McDonald et al. |
| 2008/0072236 A1 | 3/2008 | Pope et al. |
| 2010/0030975 A1 | 2/2010 | Murray et al. |
| 2011/0314238 A1 | 12/2011 | Finkler |
| 2013/0117761 A1 | 5/2013 | Archer |
| 2013/0219057 A1 | 8/2013 | Li et al. |
| 2014/0289725 A1 | 9/2014 | Valayutham |
| 2015/0186192 A1 | 7/2015 | Dyakin et al. |
| 2016/0043897 A1 | 2/2016 | Xing |

* cited by examiner

USING SHARED MEMORY TO TRANSPORT DATA BETWEEN SERVER PROCESSES

CROSS REFERENCE TO RELATED APPLICATION

This application is a continuation of U.S. patent application Ser. No. 15/695,745, titled "USING SHARED MEMORY TO TRANSPORT DATA BETWEEN SERVER PROCESSES," filed Sep. 5, 2017, which is incorporated herein by reference in its entirety.

BACKGROUND

1. Field of the Invention

This invention pertains in general to web server architectures and in particular to transporting data between server processes.

2. Description of the Related Art

In a traditional web server architecture, different processes accept, supervise, and process web requests and responses. The requests and responses are associated with data, such as contents of web pages, files, images, etc., that need to be transported between the different processes. The different processes have their own independent address spaces that temporarily store the data for transport and processing.

In traditional web server architectures, sockets may be used to transport data between the different address spaces. However, using sockets can require a large number of copy operations to move data between address spaces of the different processes. It is computationally inefficient for the web server to engage in the many memory copy operations, which can lead to high memory utilization and high memory overhead requirements. Moreover, copy operations require extra resources, such as locking operations for worker processes that receive data from a router process. Therefore, the performance of the web server is impacted due to the large number of copy operations for transporting data in traditional web server architectures.

SUMMARY

The above and other needs are met by methods, computer-readable storage media, and systems for dynamically sharing data from a first process to a second process.

One aspect provides a computer-implemented method for dynamically sharing data from a first process to a second process by creating a shared memory segment, obtaining a file descriptor referencing the shared memory segment, and mapping the shared memory segment in an address space of the first process. The file descriptor is sent to the second process. Responsive to receiving the file descriptor, the shared memory segment is mapped in an address space of the second process. Via the shared memory segment, data from the first process is shared to the second process.

Another aspect provides a non-transitory computer-readable storage medium storing executable computer program instructions for dynamically sharing data from a first process to a second process. The computer program instructions create a shared memory segment, obtain a file descriptor referencing the shared memory segment, and map the shared memory segment in an address space of the first process. The file descriptor is sent to a second process. Responsive to receiving the file descriptor, the shared memory segment is mapped in an address space of the second process. Via the shared memory segment, data from the first process is shared to the second process.

Still another aspect provides a system for dynamically sharing data from a first process to a second process. The system includes a computer processor and a non-transitory computer-readable storage medium storing executable computer program instructions that when executed by the computer processor perform actions including creating a shared memory segment, obtaining a file descriptor referencing the shared memory segment, and mapping the shared memory segment in an address space of a first process. The file descriptor is sent to a second process. Responsive to receiving the file descriptor, the shared memory segment is mapped in an address space of the second process. Via the shared memory segment, data from the first process is shared to the second process.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a computing environment supporting use of shared memory to transport data between processes of a web server, according to one embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
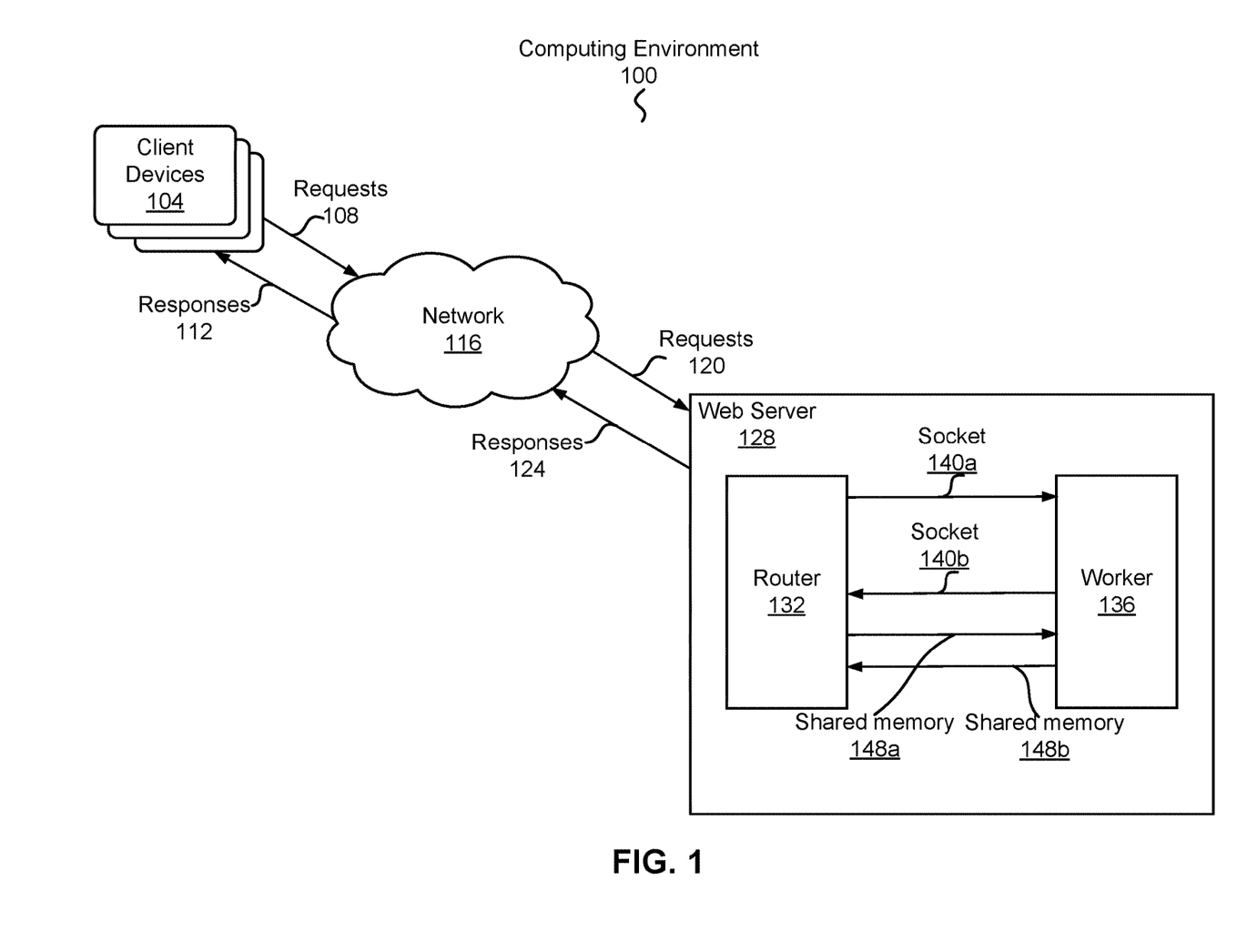

Computing Environment Supporting Dynamic Creation of a Shared Memory Server Architecture FIG. 1 is a high-level block diagram of a computing environment 100 supporting use of shared memory to transport data between processes of a web server 128, according to one embodiment. FIG. 1 illustrates multiple client devices 104 and a web server 128 connected by a network 116. While only a few client devices 104 and one web server are shown in FIG. 1, embodiments of the computing environment 100 can have many such entities connected to the network.

FIG. 1 uses like reference numerals to identify like elements. A letter after a reference numeral, such as "140a," indicates that the text refers specifically to the element having that particular reference numeral. A reference numeral in the text without a following letter, such as "140,"

refers to any or all of the elements in the figures bearing that reference numeral. For example, "140" in the text refers to reference numerals "140a" and/or "140b" in the figures.

A client device 104 is an electronic device used by a user to perform functions such as consuming digital content, executing software applications, browsing web sites hosted by or otherwise interacting with the web server 128 on the network 116, and downloading files. For example, the client device 104 may be a smartphone or a tablet, notebook, or desktop computer. In addition, the client device 104 may be an Internet-of-Things (IoT)-connected device such as a home appliance, or even another web server. The client device 104 may include a display device on which the user may view digital content stored on the client device 104 or downloaded from the web server 128. In addition, the client device 104 may include a user interface (UI), such as physical and/or on-screen buttons, with which the user may interact to perform functions such as consuming digital content, obtaining digital content, and transmitting digital content.

A client device 104 sends requests 108 to the web server 128 via the network 116. A request 108 seeks to access a resource maintained, controlled, or otherwise accessible by the web server 128. In one embodiment, the client device 104 sends the request 108 using the Hypertext Transfer Protocol (HTTP) or a secure variant thereof. For example, a web browser on the client device 104 may send a request 108 to the web server 128 to post or fetch a file (e.g., a web page or an image). The request 108 includes information identifying the requested resource and may also include information identifying the content to be posted, the client device 104, the server 128, and the session.

The network 116 enables communications among the client devices 104 and the web server 128. To this end, the network 116 receives requests 108 and corresponding data (e.g., contents of a file to be posted on a web page) from client devices 104 and forwards the requests 120 to the web server 128. Likewise, the network 116 receives responses 124 and corresponding data (e.g., an image to be downloaded from a web page) from the web server 128 and forwards the responses 112 to the client devices 104.

The network 116 can comprise the Internet as well as mobile telephone networks. In one embodiment, the network 116 uses standard communications technologies and/or protocols. Thus, the network 116 can include links using technologies such as Ethernet, 802.11, Long-Term Evolution (LTE), etc. The networking protocols used on the network 116 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The web server 128 receives and processes requests 120 from the client devices 104 and sends responses 124 back to the requesting client devices 104. As mentioned above, the requests 120 received by the web server 128 are typically associated with data. For a given request 120, the web server 128 may also obtain a requested data resource and send a response 124 providing the data resource back to the requesting client device 104. The data resource is typically a file or other data, such as a web page or component thereof. Requests 120 received by the web server 128 are processed by one or more router modules 132. In one embodiment, the router module 132 is a process that analyzes the requests 120 and routes the requests 120 to one or more workers 136 for further processing. The workers 136 may be processes and/or threads executing within a process space. There may be multiple router modules 132 operating concurrently in order to support load balancing and other features. Upon processing the requests, the workers 136 send responses and data back to the router module 132.

The router module 132 and workers 136 use shared memory segments 148 to share data related to the requests and responses generated therefrom. In one embodiment, the router module 132 uses one or more shared memory segments 148a for each worker 136 with which the router communicates. These shared memory segments 148a are used for unidirectional communications from the router module 132 to the worker 136. A worker 136 likewise uses one or more other shared memory segments 148b to engage in unidirectional communications with the router module 132. In addition, the router module 132 and worker 136 use a pair of unidirectional sockets 140a, 140b to respectively send messages about the shared memory segments 148. The sockets 140 effectively serve as control channels using which the router module 132 and worker 136 can exchange control messages about the shared memory segments 148.

Using shared memory segments 148 in this way allows the router module 132 and worker 136 to efficiently share data related to requests and responses. The sharing entity can place the data to be shared in the shared memory segment 148 and the recipient entity can read the data directly from the shared memory segment. This technique avoids the memory copy operations and additional overhead that would be incurred if the sockets were used to transport the shared data between the entities. Hence the technique is performed on web servers 128 having multiple router modules 132 and/or workers 136. In addition, this technique provides security and fault isolation by using discrete shared memory segments between each router module 132 and workers 136. While this description refers to using shared memory segments between a router module 132 and a worker 136, the techniques described herein can be used to share data between any two processes.

Shared Memory Server Architecture Supporting Data Transport

Figure 2:
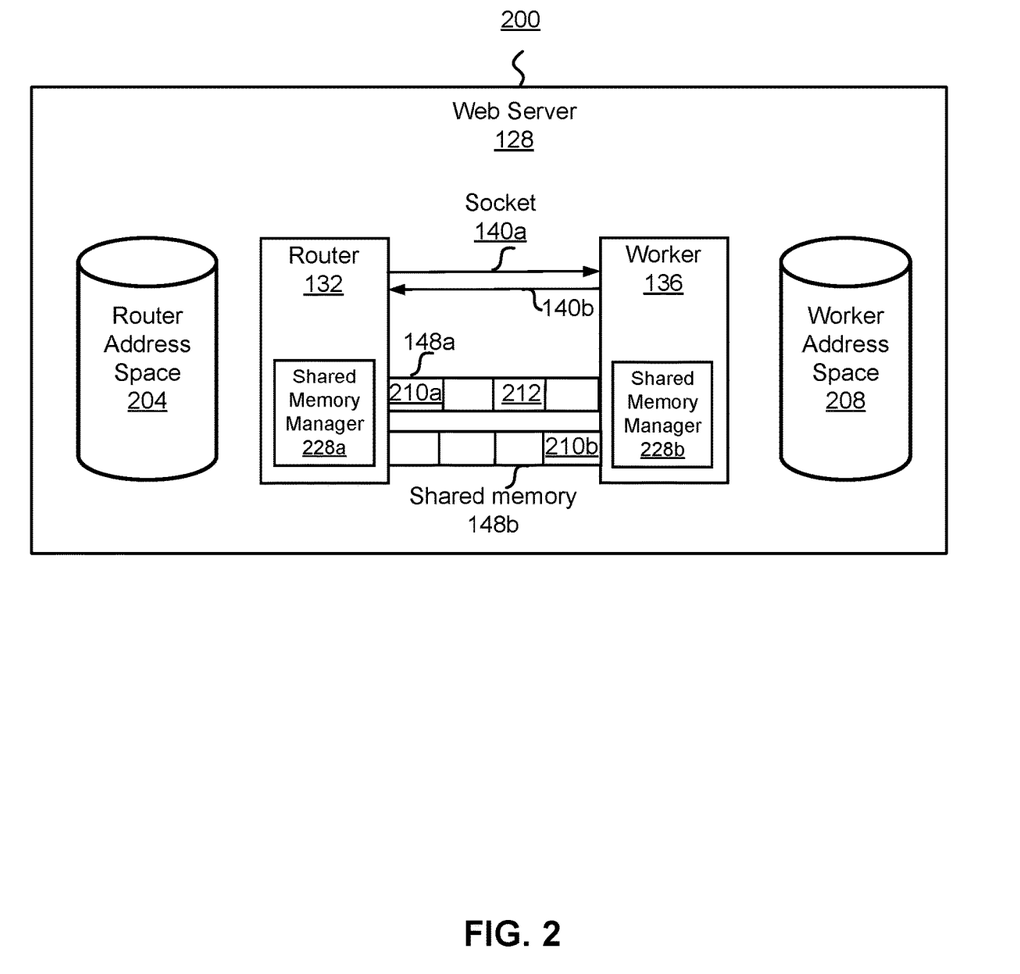
FIG. 2 is a high-level block diagram illustrating a more detailed view of the web server architecture, according to one embodiment.

FIG. 2 is a high-level block diagram illustrating a more detailed view of the web server architecture 200, according to one embodiment. FIG. 2 illustrates the router module 132 and worker 136 of FIG. 1. In addition, FIG. 2 illustrates the pair of unidirectional sockets 140a, 140b and the shared memory segments 148a, 148b. FIG. 2 likewise illustrates that the router 132 has an associated router address space 204 and the worker 136 has an associated worker address space 208. The router module 132 and worker 136 each include a shared memory manager 228. Other embodiments of the web server 128 can have different and/or other modules than the ones described here, and the functionalities can be distributed among the modules in a different manner.

As discussed earlier, the router module 132 supervises processing of requests from the client devices 104. When an inbound request 120 with its corresponding data reaches the web server 128, it is passed to the router module 132. The router module 132 analyzes the request 120 and routes the request and its corresponding data to workers 136. The router module 132 may perform load balancing to distribute requests 120 across multiple router threads to increase throughput and reduce latency. The router module 132 may use routing policies to control the flow and assignment of requests.

The router module 132 uses the router address space 204 to store data related to its execution. The shared memory manager 228a in the router module 132 allocates a portion of the router's address space 204 as a shared memory segment 148a. The shared memory segment 148a is portioned in a set of discrete chunks, with each chunk (e.g., chunk 212) holding a fixed amount of memory. In addition, a portion of the shared memory segment 148 contains usage information 210a indicating which of the chunks are currently holding shared data. For example, the usage information 210a may be a bitmap with each bit corresponding to a chunk of the shared memory segment 148 and having a value indicating whether the corresponding chunk is being utilized to store data.

The shared memory manager 228a also creates a socket 140a from the router module 132 to the worker 136. The shared memory manager 228a passes control messages about the shared memory segment 148a to the worker 136 via the socket 140a. The control messages may indicate, for example, that a shared memory segment has been created or that shared data has been placed in a particular chunk of a shared memory segment. The control messages may additionally instruct the worker 136 to perform a particular function with respect to the shared memory segment 148a, such as updating the usage information to indicate that shared data has been consumed by the worker 136.

The worker process 136 likewise has an associated worker address space 208 and shared memory manager 228b. The shared memory manager 228b in the worker 136 allocates a shared memory segment 148b in the worker address space 208 and creates a socket 140b for passing control messages about the shared memory segment to the router module 132. The worker process's shared memory segment 148b is functionally equivalent to the router module's shared memory segment 148a.

Each shared memory manager 228a, 228b also functions to receive control messages sent by the other shared memory manager. To this end, a shared memory manager 228 receives a message via a socket 140 indicating that a shared memory segment 148 has been created. Upon receipt of this type of message, the shared memory manager 228 creates a corresponding shared memory segment in the local address space (i.e., in the address space of the entity in which the shared memory manager 228 is located). The shared memory manager 228 reads data from the shared memory segment in response to additional control messages received via the socket.

Shared Memory Manager

Figure 3:
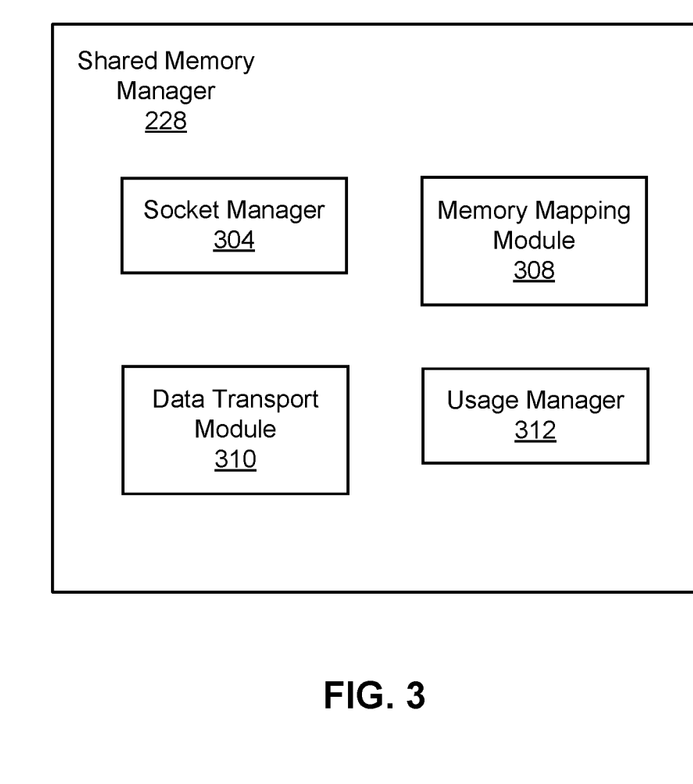
FIG. 3 is a high-level block diagram illustrating components of a shared memory manager according to one embodiment.

FIG. 3 is a high-level block diagram illustrating components of a shared memory manager 228 according to one embodiment. FIG. 3 illustrates that the shared memory manager 228 includes a socket manager 304, a memory mapping module 308, a data transport module 310, and a usage manager 312. Other embodiments of the shared memory manager 228 can have different and/or other modules than the ones described here, and the functionalities can be distributed among the modules in a different manner.

The socket manager 304 performs socket-based communications for the shared memory manager 228. These communications include transmitting control messages to other shared memory managers 228 and receiving control messages from the other shared memory managers. In one embodiment, during a setup phase, the socket manager 304 interacts with the socket manager of another shared memory manager 228 to create a pair of unidirectional sockets 140 that together form a bidirectional communication channel. The socket manager uses the pair of sockets 140 to send and receive control messages. Depending upon the embodiment, the socket manager 304 may establish and use a persistent pair of sockets for communications, or may open a socket on demand when necessary to send a control message, and then close the socket after sending the message.

The memory mapping module 308 manages shared memory segments for the shared memory manager 228. This management includes creating shared memory segments in order to share data to other entities (e.g., to a router module 132 or to a worker 136) and sending control messages to instruct the other entities to create a corresponding shared memory segments. The memory mapping module 308 may create multiple shared memory segments 148 to share data with a given entity. For example, the memory mapping module 308 may initially create one shared memory segment 148, and then create additional segments as more shared memory is required. In addition, the shared memory management includes receiving control messages from other entities including notifications that shared memory segments have been created, and creating a corresponding shared memory segment based on the notification.

In one embodiment, the memory mapping module 308 creates a shared memory segment, obtains a file descriptor referencing the shared memory segment, and maps the shared memory segment in the local address space of the process in which the shared memory manager 228 is executing (i.e., in the router address space 204 or worker address space 208). In some embodiments, the memory mapping module 308 creates the shared memory segment using the Linux "memfd_create" system call. The system call returns a file descriptor referencing the shared memory segment. The memory mapping module 308 maps the shared memory segment using the UNIX "mmap( )" system call. This system call establishes a mapping between the process's local address space and the shared memory segment. The memory mapping module 308 interacts with the socket manager 304 to send a control message to the other entity with which the memory segment is to be shared. The control message includes the file descriptor for the shared memory segment.

The memory mapping module 308 may also receive a control message including a file descriptor for a shared memory segment created by a different shared memory manager 228. In this case, the memory mapping module 308 performs the mmap( ) call using the file descriptor in order to map the shared memory segment in the local address space that is shared with the corresponding memory segment in the other process's local address space.

In one embodiment, a shared memory segment is partitioned into multiple chunks. The chunks may be evenly-sized. For example, if a shared memory segment is one megabyte in size, it may be formed of eight 128 KB chunks. Alternatively, some or all of the chunks may be of different sizes. The memory mapping module 308 that creates a shared memory segment may include information about the partitioning of the memory segment in the control messages sent to the entity with which the memory segment is shared.

The data transport module 310 transports data using shared memory segments. A shared memory segment can be written and read by many sharing entities. However, in one embodiment a shared memory segment is used for only unidirectional data sharing. The entity that created the shared memory segment writes to the segment to send data to the other entity with which the memory segment is shared. Likewise, an entity reads from a shared memory segment created by another entity in order to receive data shared by the other entity.

In one embodiment, the entity sharing the data writes the data to one or more chunks of one or more shared memory segments. For example, assume the router module 132 is sharing data with the worker 136. The router module 132 writes the data to be shared to a chunk (e.g., chunk 212) of the shared memory segment 148a that is shared with the worker 136. The router module 132 may perform this write by writing the data to the address in the router module's local address space 204 corresponding to the location of the chunk in the shared memory segment 148.

The data transport module 310 detects the write to the chunk within the shared memory segment 148a, and notifies the entity with which the segment has been shared of the shared data. Specifically, the data transport module 310 uses the socket to send a control message to the other shared memory manager 228. The control message indicates that data has been written to the shared memory segment and identifies the chunk to which the data were written (e.g., by specifying the index of the chunk).

The data transport module 310 also detects when data has been shared by another entity. In this case, the data transport module 310 receives a control message via a socket, where the control message indicates that data has been written to a particular chunk of a shared memory segment. The data transport module 310 may then notify the entity in which it is located of the shared data, so that the data can be consumed.

The usage manager 312 manages the usage information 210 for shared memory segments. As mentioned earlier, the usage information 210 is stored within a shared memory segment and indicates which of the chunks in that segment are currently holding shared data. In one embodiment, the usage information is a bitmap with each bit corresponding to a chunk of the shared memory segment 148 and having a value indicating whether the corresponding chunk is being utilized to store data. Other embodiments may represent the usage information 210 using other techniques, such as via a linked list.

In one embodiment, the usage manager 312 can update the state of the usage information 210 using atomic instructions. One instruction updates the usage information 210 to indicate that a particular chunk is being used (e.g., sets a bit to 1), while another instruction updates the usage information 210 to indicate that a particular chunk is not being used (e.g., sets a bit to 0). The usage manager 312 detects when data are written to a particular chunk of a shared memory segment 148 (e.g., upon notification by the data transport module 310) and updates the usage information to reflect that the chunk is occupied by shared data. In addition, the usage manager detects 312 when data are read from a particular chunk of a shared memory segment 148 and updates the usage information to reflect that the chunk has been consumed and is available to be reused with different data. Note that this latter update is performed by the entity that is consuming the shared data.

For example, assume that the router module 132 is sharing data with the worker 136. In this instance, the router module 132 writes data to a particular chunk (e.g., chunk 212) of the memory segment 148a that the router module has shared with the worker 136. The usage manager 312 of the shared memory manager 228a in the router module updates the usage information 210a in the shared memory segment 148a to indicate that that chunk is in use. Subsequently, the worker 136 consumes (e.g., reads) the data in the chunk 212 of the shared memory segment 148a. The usage manager 312 of the shared memory manager 228b in the worker 136 then updates the usage information 210a in the shared memory segment 148a to indicate that the chunk is no longer in use.

Thus, through atomic operations the two entities can use the usage information 210 to communicate about the current state of the shared memory segment 148. This way, a shared memory manager 228 can reuse a chunk within a shared memory segment 148 to share new data once the old data in that segment are consumed. Due to race conditions or other circumstances, the usage information may become inaccurate. Therefore, in one embodiment, the usage manager 312 can send a control message to the entity with which the memory segment is shared requesting that the entity update its usage information. Upon receiving such a control message, the usage manager 312 resets the usage information 210 for the shared memory segment 148 to reflect the current state of the data. This control message may be sent, for example, when the usage information 210 indicates that all chunks are in use; the usage manager 312 that receives the message may then update the usage information to indicate that all or some of the chunks have been consumed.

In this manner, efficient data transport is attained using a pool of dynamically allocated shared memory segments 148 to simultaneously process different requests 120. This technique increases web server 128 performance and reduces latency in execution by avoiding multiple copy operations for the data. Shared memory segments are created dynamically based on load balancing between server processes. Memory segments referenced by lightly loaded processes are deleted to shift resources to processes that have higher workloads. For example, a shared memory segment may be deleted responsive to the determination that the shared memory segment has not been used for a threshold period of time. The technique therefore performs processing of web applications more efficiently and reduces memory and system resource requirements. Each router module 132 is able to process multiple requests simultaneously, thereby improving the distribution of workloads across multiple computing resources and reducing resource use, increasing throughput, reducing response time, and avoiding the overload of any single resource.

Process for Transporting Data Over a Shared Memory Segment

Figure 4:
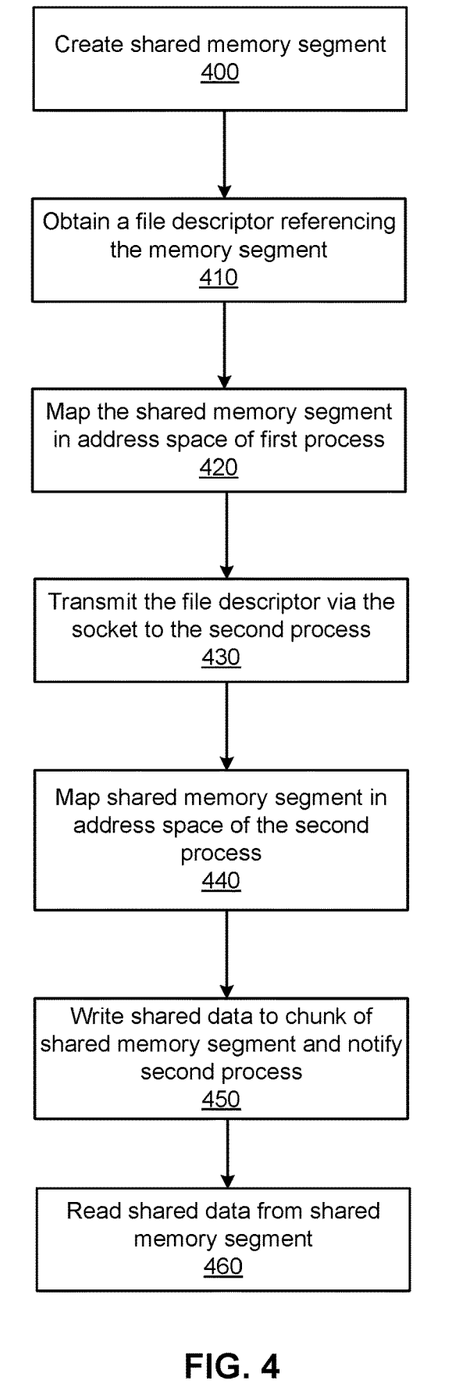
FIG. 4 is a flowchart illustrating steps performed to dynamically share data using a shared memory segment, according to one embodiment.

FIG. 4 is a flowchart illustrating steps performed to dynamically share data using a shared memory segment, according to one embodiment. The steps of FIG. 4 may be performed by the shared memory manager 228. Some or all of the steps may be also performed by other entities. Likewise, the shared memory manager 228 may perform the steps in different orders, and/or perform different or additional steps.

Assume for purposes of FIG. 1 that data are shared from a first process (e.g., the router module 132) to a second process (e.g., a worker). In one embodiment, the mapping process creates 400 a shared memory segment and obtains 410 a file descriptor referencing it. The first process performs a memory map operation using the file descriptor and maps 420 the shared memory segment in its local address space.

The first process transmits 430 the file descriptor to the second process via a socket created prior to the communication. The second process receives the file descriptor and uses it to map 440 the shared memory segment to the local address space of the second process. The first process writes 450 data to be shared to one or more chunks of the shared memory segment and updates the usage information for the segment to indicate that the chunks are in use. Note that the first process may write data to one or more chunks of one or more shared memory segments. The first process also sends 450 a control message to the second process via the socket that notifies the second process of the shared data.

The second process receives the control message and reads 460 the shared data from the chunks of the shared memory segment. The second process also updates the usage information to indicate that the shared data have been consumed. Hence, the first process can reuse those chunks to share additional data in a subsequent transaction.

The steps described above can also be performed by the second process in order to share data from the second process to the first process.

Example Machine Providing a Shared Memory

Figure 5:
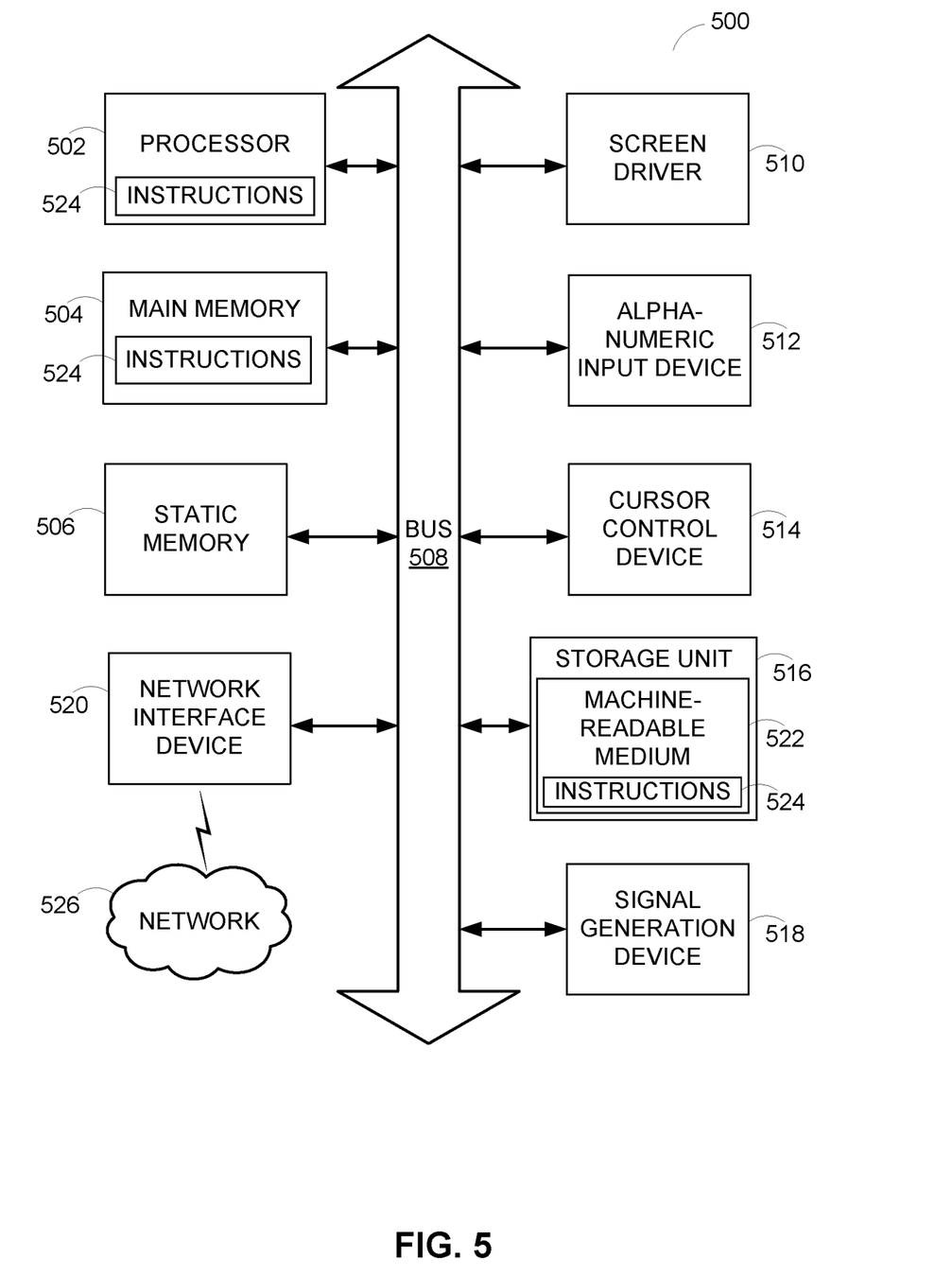
FIG. 5 illustrates components of an example machine able to read instructions to dynamically use shared memory segments to exchange data, according to one embodiment.

FIG. 5 illustrates components of an example machine 500 able to read instructions to dynamically use shared memory segments to exchange data, according to one embodiment. Those of skill in the art will recognize that other embodiments of the machine 500 can have different and/or other modules than the ones described here, and that the functionalities can be distributed among the modules in a different manner.

Specifically, FIG. 5 shows a diagrammatic representation of a machine in the example form of a computer system 500. The computer system 500 can be used to execute instructions 524 (e.g., program code modules) that cause the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a cloud server residing on a shared "virtualized" environment managed by a cloud hosting provider, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a screen driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., program code modules) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any non-transitory medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for sharing data from a first process to a second process in a server, comprising:
    opening, by the first process, a unidirectional socket from the first process to the second process, wherein the unidirectional socket provides a unidirectional communication channel to the second process;
    sending, by the first process, a descriptor to the second process using the unidirectional socket, the descriptor referencing a shared memory segment mapped to a process address space of the first process in server memory, the shared memory segment comprising an amount of memory organized as a data portion and a usage information portion indicative of usage of the data portion;
    writing, by the first process, the data to the data portion of the shared memory segment using the mapped process address space of the first process;
    updating, by the first process, usage information indicating the data is stored in the data portion of the shared memory segment, by writing the updated usage information to the usage information portion of the shared memory segment using the mapped process address space of the first process;
    sending, by the first process, a control message to the second process using the unidirectional socket, the control message indicating that the data is stored in the shared memory segment; and
    determining, by the first process, the data was read by the second process, by reading the usage information from the usage information portion of the shared memory segment using the mapped process address space of the first process and detecting a change in the usage information from when the usage information was updated by the first process.

2. The method of claim 1, further comprising:
responsive to receiving the descriptor, mapping, by the second process, using the descriptor, the shared memory segment to a process address space of the second process comprising server memory allocated for the second process, and wherein the second process updates the usage information indicating the data is read from the amount of memory in the shared memory segment, by writing the updated usage information to the usage information portion of the shared memory segment using the mapped process address space of the second process.

3. The method of claim 1, wherein the usage information written to the usage information portion of the shared memory segment is written using an atomic instruction.

4. The method of claim 1, further comprising:
responsive to determining that the usage information indicates there is no space to store new data in the data portion, transmitting another control message from the first process to the second process to request the second process update the usage information and notify the first process when there is space to store new data in the data portion.

5. The method of claim 1, wherein the control message from the first process to the second process comprises an index specifying a location within the data portion of the shared memory segment where the data is to be read by the second process.

6. A computer apparatus, comprising memory comprising programmed instructions stored thereon and one or more processors configured to execute the stored programmed instructions to share data from a first process to a second process, wherein the instructions, upon execution, cause the apparatus to:
open, by the first process, a unidirectional socket from the first process to the second process, wherein the unidirectional socket provides a unidirectional communication channel to the second process;
send, by the first process, a descriptor to the second process using the unidirectional socket, the descriptor referencing a shared memory segment mapped to a process address space of the first process in server memory, the shared memory segment comprising an amount of memory organized as a data portion and a usage information portion indicative of usage of the data portion;
write, by the first process, the data to the data portion of the shared memory segment using the mapped process address space of the first process;
update, by the first process, usage information indicating the data is stored in the data portion of the shared memory segment, by writing the updated usage information to the usage information portion of the shared memory segment using the mapped process address space of the first process;
send, by the first process, a control message to the second process using the unidirectional socket, the control message indicating that the data is stored in the shared memory segment; and
determine, by the first process, the data was read by the second process, by reading the usage information from the usage information portion of the shared memory segment using the mapped process address space of the first process and detecting a change in the usage information from when the usage information was updated by the first process.

7. The apparatus of claim 6, wherein the instructions, upon execution, further cause the apparatus to:
responsive to receiving the descriptor, map, by the second process, using the descriptor, the shared memory segment to a process address space of the second process comprising server memory allocated for the second process, and wherein the second process updates the usage information indicating the data is read from the amount of memory in the shared memory segment, by writing the updated usage information to the usage information portion of the shared memory segment using the mapped process address space of the second process.

8. The apparatus of claim 6, wherein the usage information written to the usage information portion of the shared memory segment is written using an atomic instruction.

9. The apparatus of claim 6, wherein the instructions, upon execution, further cause the apparatus to:
responsive to determining that the usage information indicates there is no space to store new data in the data portion, transmit another control message from the first process to the second process to request the second process update the usage information and notify the first process when there is space to store new data in the data portion.

10. The apparatus of claim 6, wherein the control message from the first process to the second process comprises an index specifying a location within the data portion of the shared memory segment where the data is to be read by the second process.

11. A non-transitory computer-readable medium having stored thereon instructions for sharing data from a first process to a second process, the instructions comprising executable code which when executed by one or more processors, causes the one or more processors to:
open, by the first process, a unidirectional socket from the first process to the second process, wherein the unidirectional socket provides a unidirectional communication channel to the second process;
send, by the first process, a descriptor to the second process using the unidirectional socket, the descriptor referencing a shared memory segment mapped to a process address space of the first process in server memory, the shared memory segment comprising an amount of memory organized as a data portion and a usage information portion indicative of usage of the data portion;
write, by the first process, the data to the data portion of the shared memory segment using the mapped process address space of the first process;
update, by the first process, usage information indicating the data is stored in the data portion of the shared memory segment, by writing the updated usage information to the usage information portion of the shared memory segment using the mapped process address space of the first process;
send, by the first process, a control message to the second process using the unidirectional socket, the control message indicating that the data is stored in the shared memory segment; and
determine, by the first process, the data was read by the second process, by reading the usage information from the usage information portion of the shared memory segment using the mapped process address space of the first process and detecting a change in the usage information from when the usage information was updated by the first process.

12. The computer-readable medium of claim 11, wherein the instructions, upon execution, further cause the one or more processors to:
responsive to receiving the descriptor, map, by the second process, using the descriptor, the shared memory segment to a process address space of the second process comprising server memory allocated for the second process, and wherein the second process updates the usage information indicating the data is read from the amount of memory in the shared memory segment, by writing the updated usage information to the usage information portion of the shared memory segment using the mapped process address space of the second process.

13. The computer-readable medium of claim 11, wherein the usage information written to the usage information portion of the shared memory segment is written using an atomic instruction.

14. The computer-readable medium of claim 11, wherein the instructions, upon execution, further cause the one or more processors to:
responsive to determining that the usage information indicates there is no space to store new data in the data portion, transmit another control message from the first process to the second process to request the second process update the usage information and notify the first process when there is space to store new data in the data portion.

15. The computer-readable medium of claim 11, wherein the control message from the first process to the second process comprises an index specifying a location within the data portion of the shared memory segment where the data is to be read by the second process.

16. A system, comprising one or more server devices comprising memory comprising programmed instructions stored thereon and one or more processors configured to execute the stored programmed instructions to:
open, by the first process, a unidirectional socket from the first process to the second process, wherein the unidirectional socket provides a unidirectional communication channel to the second process;
send, by the first process, a descriptor to the second process using the unidirectional socket, the descriptor referencing a shared memory segment mapped to a process address space of the first process in server memory, the shared memory segment comprising an amount of memory organized as a data portion and a usage information portion indicative of usage of the data portion;
write, by the first process, the data to the data portion of the shared memory segment using the mapped process address space of the first process;
update, by the first process, usage information indicating the data is stored in the data portion of the shared memory segment, by writing the updated usage information to the usage information portion of the shared memory segment using the mapped process address space of the first process;
send, by the first process, a control message to the second process using the unidirectional socket, the control message indicating that the data is stored in the shared memory segment; and
determine, by the first process, the data was read by the second process, by reading the usage information from the usage information portion of the shared memory segment using the mapped process address space of the first process and detecting a change in the usage information from when the usage information was updated by the first process.

17. The system of claim 16, wherein the one or more processors are further configured to execute the stored programmed instructions to:
responsive to receiving the descriptor, map, by the second process, using the descriptor, the shared memory segment to a process address space of the second process comprising server memory allocated for the second process, and wherein the second process updates the usage information indicating the data is read from the amount of memory in the shared memory segment, by writing the updated usage information to the usage information portion of the shared memory segment using the mapped process address space of the second process.

18. The system of claim 16, wherein the usage information written to the usage information portion of the shared memory segment is written using an atomic instruction.

19. The system of claim 16, wherein the one or more processors are further configured to execute the stored programmed instructions to:
responsive to determining that the usage information indicates there is no space to store new data in the data portion, transmit another control message from the first process to the second process to request the second process update the usage information and notify the first process when there is space to store new data in the data portion.

20. The system of claim 16, wherein the control message from the first process to the second process comprises an index specifying a location within the data portion of the shared memory segment where the data is to be read by the second process.

\* \* \* \* \*